Dec. 22, 1931.    R. W. DULL    1,837,415
ANTIFRICTION BEARING
Filed Sept. 9, 1929
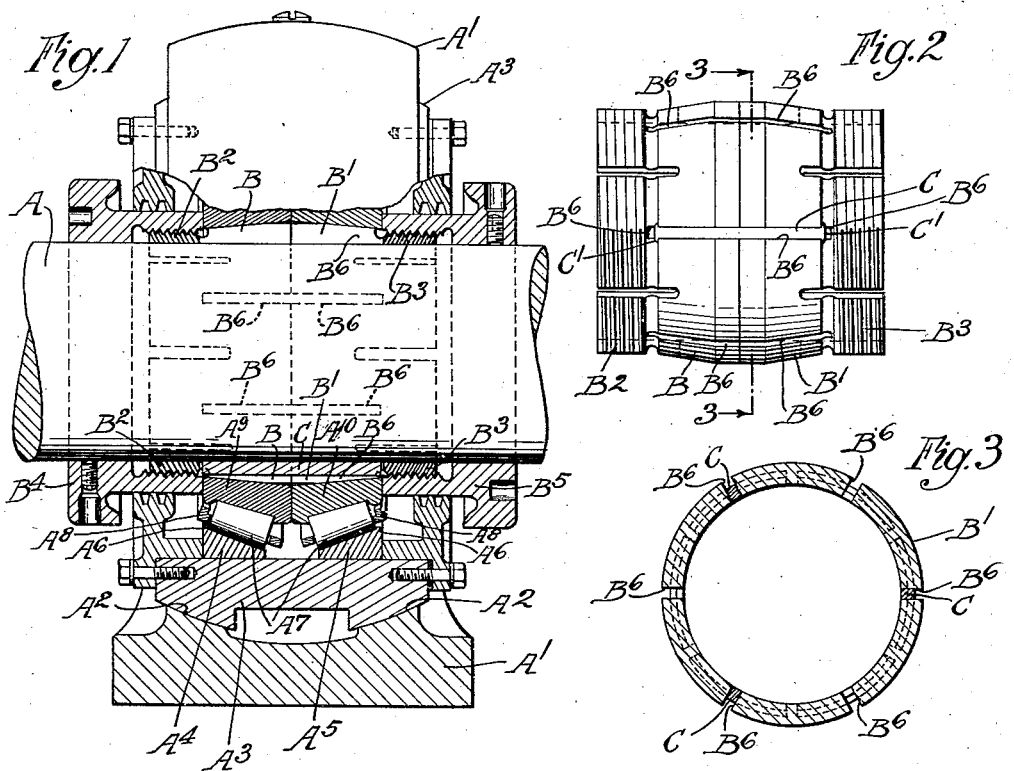
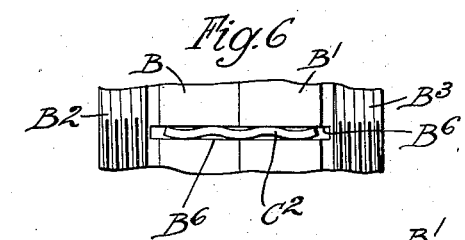
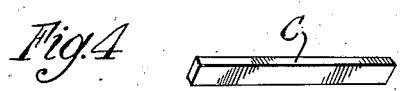
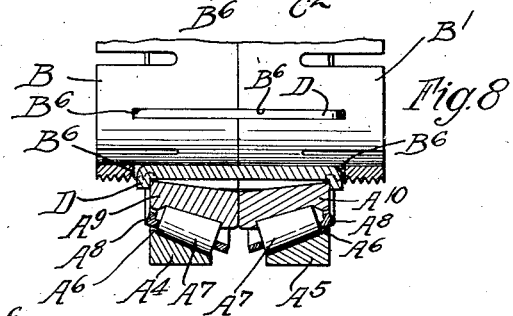
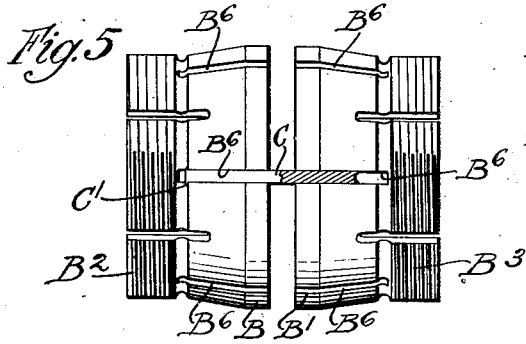
Inventor
Raymond W. Dull
Parker & Carter
Attorneys Patented Dec. 22, 1931

1,837,415

UNITED STATES PATENT OFFICE

RAYMOND W. DULL, OF CHICAGO, ILLINOIS, ASSIGNOR TO LINK-BELT COMPANY, OF CHICAGO, ILLINOIS, A CORPORATION OF ILLINOIS

ANTIFRICTION BEARING

Application filed September 9, 1929. Serial No. 391,138.

My invention relates to anti-friction bearings especially of the roller type.

As illustrated my invention is applied specifically to the tapered roller bearing type of roller bearing as applied to shafting and has for one object to provide means for separately clamping a pair of roller bearings upon a shaft while holding them in fixed working relation to the end that each bearing may be separately, rigidly mounted on the shaft by means interposed directly between the bearing and the shaft so that there will be no possible distortion or bending or strain other than compression strain between the bearing and the shaft.

Among the objects of my invention are to provide means for holding the two locking or clamping sleeves against relative rotation before they are tightened upon the shaft. It will be understood that this is of the utmost importance because since such a device as mine is primarily applicable to undersize shafting and since the bearing is ordinarily assembled on the shaft with the parts in assembled position and the locking of the bearing on the shaft takes place last if there is much friction between the tightening nut and the thread on the wedging or clamping sleeve, that sleeve will rotate with the nut and the nut will be unable to travel along the thread to clamp it. An important feature of my invention therefore is to provide means whereby the two nuts may be operated or controlled simultaneously and one nut serve as a support or abutment for the other to prevent undesired rotation of the clamping sleeve, this being done, of course, by the provision of means to prevent relative rotation of the two clamping sleeves.

My invention is illustrated more or less diagrammatically in the accompanying drawings wherein—

Figure 1 is a partial section through a bearing incorporating my invention;

Figure 2 is a side elevation of the two locking sleeves;

Figure 3 is a section taken along the line 3—3 of Figure 2;

Figure 4 is a perspective view of one form of sleeve interlocking key;

Figure 5 is a side elevation illustrating the two locking sleeves drawn apart;

Figure 6 is a side elevation of the locking sleeve with the alternate form of key;

Figure 7 is a perspective view of the alternate form of key;

Figure 8 shows a further modification of my device.

Like parts are indicated by like characters.

A is a shaft. $A^1$ is a pillow block having in this case a pair of interior segmental spherical bearing surfaces $A^2$. $A^3$ is an exteriorly spherical bushing mounted in the bearing surface $A^2$. This bushing is bored out centrally cylindrical. $A^4$ $A^5$ are the exterior races of a pair of roller bearings, they are exteriorly cylindrical, interiorly tapered with their larger interior diameters adjacent. These races are flanged at their outer ends as at $A^6$ to engage the usual type of anti-friction rollers $A^7$, nested together and provided with spacers $A^8$. $A^9$ $A^{10}$ are the inner races exteriorly tapered as indicated with their larger diameters adjacent abutting side to side and interiorly tapered with their larger interior diameters adjacent.

B $B^1$ are tapered wedge sleeves interiorly cylindrical to engage the shaft, exteriorly tapered to engage the tapered portions of the inner races. These sleeves have cylindrical extensions $B^2$ $B^3$ threaded and engaged by adjusting and clamping nuts $B^4$ $B^5$, which nuts extend inwardly to engage the outer faces of the inner roller races. The sleeves are slotted as indicated at $B^6$. These slots may extend only through the tapered portion, may extend clear through the sleeve and there may be one or more slots depending upon the size of the bearing, the material of which the sleeves are made and their compressibility, there being in any case a sufficient number of slots so that when the nuts are tightened up, drawing the sleeves outwardly along the shaft and displacing them with respect to the roller races, the sleeves are wedged between the tapered bore of the inner race and the shaft to lock the race firmly in position.

It will be noted that these sleeves initially abut. They are held against relative rotation by the key C. This key may be made a drive fit in the slots and one or more keys may be used. The ends of the key may be upset as indicated at C¹ to form a hook, or the flexible key C² may be used, the key being merely bent or corrugated to hold itself in the slot by friction, the key being adapted to give or spring when the bushings are compressed. The upset key may be a drive fit if desired. The main purpose of this key is to lock the two sleeves against relative rotation so that when one nut is turned, the other one being held, the two sleeves will be locked against relative rotation and the nut will turn on the sleeve, traveling along a thread and drawing the sleeve outwardly to wedge it between the race and the shaft.

In Figure 8 is shown a modification wherein the roller races A⁹ A¹⁰ are held positively in engagement by a hook D which extends through the slots B⁶ in the wedge rings or sleeves thereby holding them against relative rotation while permitting them to move longitudinally and at the same time by direct engagement with the races themselves holding them together so that in adjusting the device the roller races are always held in snug contact at their ends.

It will be evident that while I have shown in my drawings an operative device, still many changes might be made in the size, shape, arrangement and disposition of parts without departing materially from the spirit of my invention and I wish, therefore, that my showing be taken as in a sense diagrammatic.

I claim:

1. In combination two abutting anti-friction bearing races interiorly tapered with their major diameters adjacent, two compression sleeves cylindrical to engage a shaft, exteriorly tapered to engage the tapered bores of the races and threaded at their outer ends where they extend beyond the races, a nut on each such threaded outer end adapted to engage the outer face of one of the bearing races, a key interposed between the two sleeves and adapted to resist relative rotation while leaving them free to be moved longitudinally with respect each to the other, the key being adapted to be engaged and locked in position by the nut when it is screwed home.

2. In combination two abutting anti-friction bearing races interiorly tapered with their major diameters adjacent, two compression sleeves cylindrical to engage a shaft, exteriorly tapered to engage the tapered bores of the races and threaded at their outer ends where they extend beyond the races, a nut on each such threaded outer end adapted to engage the outer face of one of the races, a key interposed between the two sleeves and adapted to resist relative rotation while leaving them free to be moved longitudinally with respect each to the other, the key being adapted to releasably hold the sleeves together, to positively and permanently hold them against relative rotation and to permit relative longitudinal movement of the sleeves.

3. In combination two abutting anti-friction bearings interiorly tapered with their major diameters adjacent, two separate compression sleeves interiorly cylindrical to engage a shaft, exteriorly tapered to engage the tapered bore of inner races, threaded at their outer ends where they extend beyond the inner races, a nut on each such threaded outer end adapted to engage the outer face of one of the inner bearing races and displace the sleeve longitudinally with respect to the race, means interposed between the sleeves for preventing relative rotation, said means being adapted yieldingly to hold them against relative longitudinal movement for assembly, but adapted to yield to permit them to be moved longitudinally when they are seated in the inner races.

4. In combination two abutting anti-friction bearings interiorly tapered with their major diameters adjacent, two separate compression sleeves interiorly cylindrical to engage a shaft, exteriorly tapered to engage the tapered bore of inner races, threaded at their outer ends where they extend beyond the inner races, a nut on each such threaded outer end adapted to engage the outer side of one of the bearing inner races and displace the sleeve longitudinally with respect to the inner race, means interposed between the sleeves for preventing relative rotation, said means being adapted yieldingly to hold them against relative longitudinal movement for assembly but adapted to yield to permit them to be moved longitudinally when they are seated in the inner races, said means comprising a yielding member interlocking with one of the sleeves.

5. In combination two abutting anti-friction bearings interiorly tapered with their major diameters adjacent, two separate compression sleeves interiorly cylindrical to engage a shaft, exteriorly tapered to engage the tapered bore of the inner races, threaded at their outer ends where they extend beyond the inner races, a nut on each such threaded outer end adapted to engage the outer side of one of the inner bearing races and displace the sleeve longitudinally with respect to the inner race, means interposed between the sleeves for preventing relative rotation, said means being adapted yieldingly to hold them against relative longitudinal movement for assembly but adapted to yield to permit them to be moved longitudinally when they are seated in the inner races, said means comprising a yielding member interlocking with both of said sleeves.

6. In combination two abutting anti-friction bearings interiorly tapered with their major diameters adjacent, two separate compression sleeves interiorly cylindrical to engage a shaft, exteriorly tapered to engage the tapered bore of inner races, threaded at their outer ends where they extend beyond the inner races, a nut on each such threaded outer end adapted to engage the outer side of one of the inner bearing races and displace the sleeve longitudinally with respect to the inner race, means interposed between the sleeves for preventing relative rotation, said means being adapted yieldingly to hold them against relative longitudinal movement for assembly but adapted to yield to permit them to be moved longitudinally when the are seated in the inner races, said means comprising a member extending partially through said sleeves and upset at either end to hold them together, the upset portion being adapted to be drawn out to permit movement when power is applied to the nut threaded on the sleeve.

7. In combination two abutting anti-friction bearings interiorly tapered with their major diameters adjacent two compression sleeves cylindrical to engage a shaft, exteriorly tapered to engage the tapered bore of inner races and threaded at their outer ends where they extend beyond the inner races, a nut on each such threaded outer end adapted to engage the outer face of one of the bearing inner races, a key interposed between the two sleeves and adapted to limit relative rotation while leaving them free to be moved longitudinally with respect each to the other, said key having hooked extensions to engage the inner races and hold them in snug engagement one with another.

8. In combination two abutting anti-friction bearing races interiorly tapered with their major diameters adjacent two compression sleeves cylindrical to engage a shaft, exteriorly tapered to engage the tapered bore of inner races and threaded at their ends where they extend beyond the races, a nut on each such threaded outer end adapted to engage the outer side of one of the inner bearing races, a key interposed between the two sleeves and adapted to limit relative rotation while leaving them free to be moved longitudinally with respect each to the other, the key being adapted to engage and permanently hold the two tapered under races together.

Signed at Chicago, county of Cook and State of Illinois, this 9th day of August, 1929.

RAYMOND W. DULL.